Jan. 14, 1958     R. T. GAGE ET AL     2,819,728
FLOW REGULATOR
Filed Jan. 12, 1955
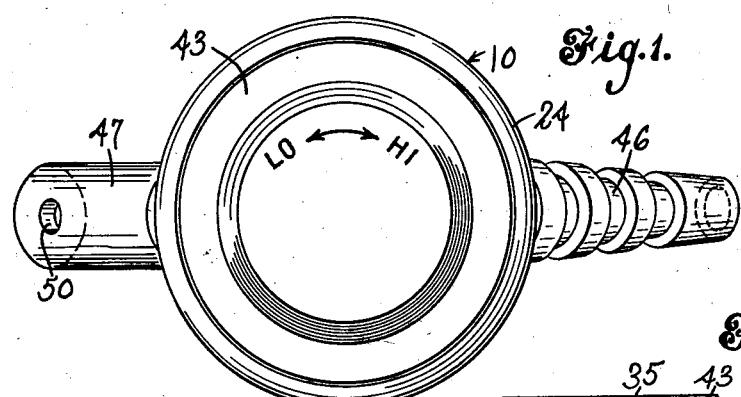
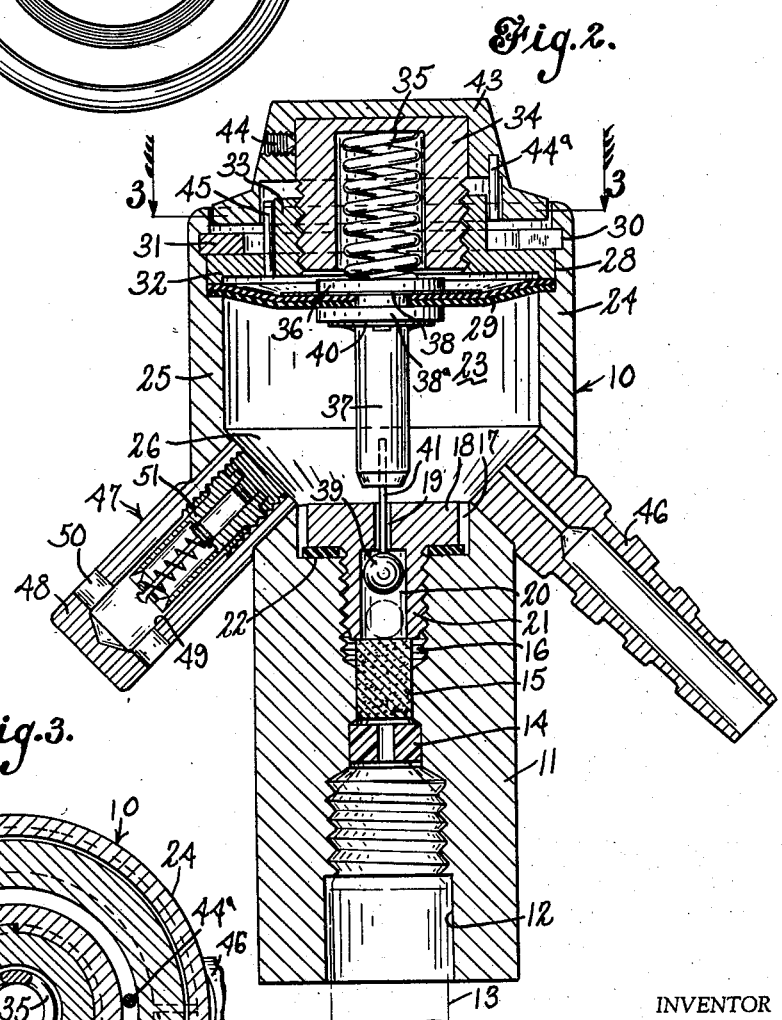
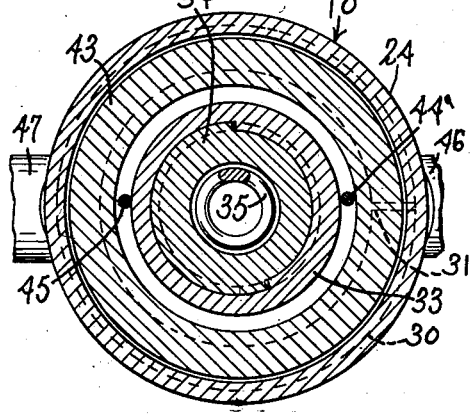
INVENTOR
Robert T. Gage and
Arthur S. Brown
BY *Rockwell & Bartholow*
ATTORNEYS

United States Patent Office 2,819,728
Patented Jan. 14, 1958

2,819,728

FLOW REGULATOR

Robert T. Gage and Arthur S. Brown, Milford, Conn., assignors to The Cycle-Flo Company, Milford, Conn., a corporation of Connecticut Application January 12, 1955, Serial No. 481,385

1 Claim. (Cl. 137—505.39)

This invention relates to flow regulators particularly well suited for use with inhalators, and relates more particularly to regulators of the type employed for reducing the pressure of a gas, oxygen, for example, flowing to an inhalator from a source of highly compressed oxygen gas.

One object of the invention is to provide an improved and simplified flow regulator for use with inhalators.

Another object of the invention is to provide a flow regulator, such as characterized above, having a variable output and which is safe for the user and easy to operate.

Further objects of the invention will be apparent from the following detailed description of one form of the invention.

In the drawing:

Fig. 1 is a top plan view of a flow regulator embodying the invention;

Fig. 2 is an elevational sectional view of the regulator taken on the median plane thereof; and Fig. 3 is a sectional view taken on line 3—3 of Fig. 2.

In the drawing, the reference numeral 10 designates generally the vertically elongated generally cylindrical casing of the flow regulator. As shown in Fig. 2, the casing 10 is provided with a lower portion 11 of reduced diameter having an upwardly extending bore 12 therein threaded throughout a portion thereof to receive the threaded nipple 13 of a cylinder of highly compressed oxygen gas. The upper end of the nipple 13 abuts a gasket 14 which is preferably formed of nylon, and which is held against upward displacement by a restriction of the bore 12 above the gasket 14. A filter element 15 abuts the upper surface of the gasket 14 and extends into a threaded and enlarged portion 16 of the bore 12, as shown in Fig. 2. The filter element 15 is preferably formed of porous bronze. Above the threaded portion 16 thereof, the bore 12 is further enlarged, as at 17, to receive a flange member 18 having a central orifice 19 communicating with a longitudinal bore 20 extending through an externally threaded boss 21 formed integrally with the flange member and threaded into the portion 16 of the bore 12. As shown in Fig. 2, the lower end of the boss 21 abuts the upper surface of the filter element 15. To provide a leakproof seal around the flange member 18, a gasket is interposed between the member 18 and the upwardly facing annular shoulder 22 of the casing. A throttling valve 39, taking the form of a polished stainless steel ball, is disposed in the bore 20 for cooperation with the orifice 19.

The orifice 19 communicates with a pressure-reducing chamber 23 formed in the enlarged upper portion 24 of the casing. The chamber 23 is bounded in part by a cylindrical wall 25 of the casing above and adjoining a conical wall 26 of the casing tapering toward the orifice 19. The cavity in the casing 10, defined in part by the cylindrical wall 25, is enlarged as by an upwardly facing counterbore 28 formed in the upper end of the casing, and a diaphragm 29, preferably formed of neoprene rubber, covers and is secured to the bottom of the counterbore 28. Intermediate the ends thereof, the counterbore 28 is provided with an annular groove 30 receiving a split ring 31 securing in place a flange member 32 overlying and engaging the edge portion of the diaphragm 29 as shown in Fig. 2, the member 32 being interposed between the ring 31 and the diaphragm 29. The flange member 32 is provided with a central internally threaded sleeve 33 extending therethrough and formed integrally with the member 32, the sleeve 33 receiving an inverted externally threaded cup-shaped member 34.

The cup-shaped member 34 receives a compression spring 35 having one end bottoming therein and having the other end thereof bearing against the enlarged upper end portion or head 36 of the plunger 37 overlying the diaphragm 29. The plunger 37 extends through the diaphragm 29 and is fixed thereto, the plunger being urged downwardly in the casing 10 by the spring 35. A washer 38 of larger diameter than the head 36 of the plunger is interposed between the head 36 and the upper surface of the diaphragm 29. A washer 38ᵃ is disposed on the plunger 37 at the underside of the diaphragm 29 and is clamped to the latter by a lock washer 40 embracing and frictionally engaged with the plunger. At the lower end thereof, the plunger 37 is provided with a longitudinal pin member 41 extensible through the orifice 19 in the flange member 18 and engageable with the ball valve 39.

A manually rotatable knob or cap 43, which may be knurled if desired, embraces and overlies the upper portion of the member 34 as shown in Fig. 2. The cap 43 is provided with a set screw 44 engaging the member 34 to hold the latter in angularly fixed relation with the cap. The knob or cap 43, which may conveniently have the outline shown in Fig. 2, is provided with a stop element 44ᵃ in fixed relation thereto cooperating with a stop element 45 in fixed relation to the casing 10. The stop element 44ᵃ, a pin, is suspended from the cap 43 and the stop element 45, also a pin, extends upwardly from the flange member 32, as shown in Fig. 2. The arrangement of the stops 44ᵃ and 45 is such that the cap 43 may be rotated with the member 32 through an arc describing almost a full circle. As shown in Fig. 1, the cap 43 is provided with indicia indicating the direction in which the cap 43 must be rotated to obtain the highest output of gas from the outlet nipple 46 of the casing.

The outlet nipple 46 extends through the conical wall 26 of the casing and is suitably secured to the casing, the nipple 46 being formed for connection to a hose-equipped inhalator, not shown. Diametrically opposite the nipple 46, the casing 10 is provided with a safety valve structure, indicated generally at 47, including an elongated plug member 48 extending through the conical wall 26 of the casing 10 and suitably secured to the casing. The plug member 48 is provided with a longitudinal bore 49 communicating with a cross bore 50. A conventional tire valve 51 spring-biased to the closed position thereof is threaded into the bore 49 in inverted position, the arrangement being such that gas in the chamber 23 may open the valve 51 and escape to the atmosphere if the pressure of the gas in the chamber 23 exceeds a predetermined value. The safety or relief valve 47 inhibits undesirably high gas pressures in the chamber 23 and when opened, provides an audible warning signal usually indicating stoppage in the hose-equipped inhalator.

From the foregoing, it will be understood that when highly compressed oxygen gas flows through a manually operable shut-off valve (not shown) and through the nipple 13 of the gas cylinder to the bore 12 of the flow regulator, and then to the bore 20 through the filter element 15, the pressure of the gas lifts the ball valve 39 from the broken line position thereof shown in Fig. 2 to a position in which the ball valve 39 engages the pin member 41. In the last-mentioned position thereof, the ball valve 39 cooperates with the orifice 19 to impede the flow of oxygen through the latter into the pressure-reducing chamber 23. In the drawing, the spring-pressed plunger 37, carrying the pin member 41, is shown in a position intermediate the highest and lowest adjusted positions possible. To increase the flow of gas through the orifice 19, the control knob 43 is rotated to the right (see Fig. 1) from the intermediate position thereof to screw the cup-shaped member 34 downwardly in the sleeve 33 so that the spring 35 moves the plunger 37 downwardly, thereby moving the ball valve 39 in a direction away from the orifice 19 to permit a larger flow through the latter. It will be understood that to decrease the flow of gas through the orifice 19, the control knob 43 is rotated to the left (see Fig. 1) from the intermediate position thereof to screw the member 34 upwardly in the sleeve 33 so that the pressure of the spring 35 on the plunger 37 is relieved to some extent. This allows the plunger 37 to move upwardly under the action of the resilient diaphragm 29, thereby permitting the ball valve 39 to move in a direction toward the orifice 19 to further impede the flow of gas through the latter. In the intermediate position of the plunger 37, shown in Fig. 2, the diaphragm 29 is slightly distended in a downward direction and is further distended when the knob 43 is rotated in a clockwise (Fig. 1) direction. When the control knob 43 is rotated in a counterclockwise (Fig. 1) direction, the diaphragm 29 tends to relax, thereby lifting the plunger 37.

As mentioned above, the stop elements 44ª and 45 limit rotation of the control knob 43 in both directions. When the control knob 43 is rotated to the left (Fig. 1) as far as it will go, 2½ liters of oxygen per minute, or thereabouts, pass through the orifice 19 and the discharge nipple 46, in the preferred form of the flow regulator. However, when the control knob 43 is rotated in the opposite direction as far as it will go, approximately seven liters of oxygen per minute pass through the orifice 19 and the discharge nipple 46 per minute. From the foregoing, it will be understood that rotation of the control knob 43 cannot completely shut off the passage of gas through the orifice 19. This has been found to be an important safety feature. On the other hand, rarely, if ever, is a supply of oxygen in excess of seven liters per minute, or thereabouts, needed by a person using an inhalator. A supply of more than seven liters of oxygen per minute would be wasteful of oxygen in most, if not all, cases. Thus it will be seen that the flow regulator of the invention, delivering a maximum of seven liters of oxygen per minute, or thereabouts, tends to conserve oxygen in the cylinder therefor. It will also be understood that if the pressure of the gas in the chamber 23 of the regulator becomes excessive, the pressure effects upward movement of the diaphragm 29 thereby permitting the ball valve 39 to close the orifice 19 so as to shut off the flow of gas into the chamber 23 until the gas pressure therein is relieved to some extent. Thus, the flow regulator delivers a substantially constant flow of gas from the discharge nipple 46 at each setting of the control knob, regardless of variations in gas pressure within the supply cylinder. In other words, as the supply of oxygen in the supply cylinder is drawn off and the pressure of the gas in the cylinder falls, the tendency of the diaphragm 29 to effect the closure of the orifice 19 lessens. Still further, it will be understood that the knob 43 controlling the plunger 37 is capable of infinite adjustment between the limits described above.

The flow regulator of the invention is very satisfactory in operation and easy to use. It is safe and conserves oxygen. The flow regulator is of simplified construction and will not easily get out of order. Furthermore, it is very compact and may be slipped in a person's pocket.

While a single form of the flow regulator has been illustrated and described above, it will be apparent that the flow regulator is susceptible of various changes in details without departure from the principles of the invention and the scope of the claim.

What we claim is:

In a flow regulator for compressed fluids, the combination of an upwardly extending valve casing provided with a lower inlet portion for connection to a cylinder of highly compressed fluid, the casing being provided with means above said portion forming a valve seat and a vertical chamber for a ball valve below said seat, a ball valve received in said chamber for free-floating movement therein and of a diameter only slightly less than the width of said vertical chamber, a fluid dispersing and filtering element intermediate said inlet portion and said means and engageable by said valve to limit downward movement of the latter, the valve casing having an enlarged opening in the upper portion thereof above said seat and communicating with an outlet port, said opening being further enlarged by an upwardly facing counterbore extending through the upper end of the valve casing, a diaphragm covering the bottom of said counterbore and forming with said casing a pressure-reducing chamber below the diaphragm, a reciprocable control element extending through said diaphragm and fixed thereto, said control element having a lower portion engageable with said ball valve to unseat the same, a flange member snugly received in the counterbore and having the peripheral portion thereof clamping the peripheral part of the diaphragm to the bottom of the counterbore, a snap ring above and positioning said flange member, said snap ring engaging the last-mentioned member and being received in a transverse groove formed in said counterbore, said flange member having an internally threaded sleeve part extending therethrough, a manually operable element of generally inverted cup shape threaded into said sleeve part and having a radially outer flange part embracing the sleeve part and extending into said counterbore, a helical spring in the cup-shaped element and compressed therein, one end of the spring bottoming in the last-mentioned element and the other end thereof bearing against the upper end of said control element and urging the latter downwardly in the casing, said spring and said diaphragm operably connecting said control element with said ball valve and the arrangement being such that said control element may be adjusted upon rotation of said manually operable element, and means on said flange member co-acting with means on said manually operable element to limit rotation of the latter.

References Cited in the file of this patent
UNITED STATES PATENTS

| | | |
|---|---|---|
| 2,156,823 | Stettner | May 2, 1939 |
| 2,192,141 | McElwaine | Feb. 27, 1940 |
| 2,313,564 | Manly | Mar. 9, 1943 |
| 2,431,437 | Van Der Werff | Nov. 25, 1947 |